United States Patent
Vaudt et al.

(10) Patent No.: US 9,758,072 B2
(45) Date of Patent: Sep. 12, 2017

(54) AUXILIARY TRACTOR SEAT

(71) Applicant: Hy-Capacity Inc., Humboldt, IA (US)

(72) Inventors: Chad Vaudt, Humboldt, IA (US); Aric Lange, Humboldt, IA (US)

(73) Assignee: Hy-Capacity Inc., Humboldt, IA (US)

( * ) Notice: Subject to any disclaimer, the term of this patent is extended or adjusted under 35 U.S.C. 154(b) by 49 days.

(21) Appl. No.: 14/906,420

(22) PCT Filed: Jul. 21, 2014

(86) PCT No.: PCT/US2014/047390
§ 371 (c)(1),
(2) Date: Jan. 20, 2016

(87) PCT Pub. No.: WO2015/013175
PCT Pub. Date: Jan. 29, 2015

(65) Prior Publication Data
US 2016/0152165 A1 Jun. 2, 2016

Related U.S. Application Data

(60) Provisional application No. 61/857,058, filed on Jul. 22, 2013.

(51) Int. Cl.
*A47C 15/00* (2006.01)
*B60N 2/38* (2006.01)
(Continued)

(52) U.S. Cl.
CPC ............... *B60N 2/38* (2013.01); *B60N 2/01* (2013.01); *B60N 2/206* (2013.01); *B60N 2/46* (2013.01);
(Continued)

(58) Field of Classification Search
CPC .. E02F 9/166; B60N 2/38; B60N 2/39; B60N 2/682; B60N 2/684; B60N 2/06; B60N 2/206; B60N 2/04
(Continued)

(56) References Cited

U.S. PATENT DOCUMENTS 2,534,386 A * 12/1950 Stewart ................... B60N 2/38
248/371
2,667,913 A * 2/1954 Dustin ..................... A61H 3/00
297/252

(Continued)

FOREIGN PATENT DOCUMENTS

DE      3239895 A1   5/1984
WO   WO-2015013175 A2   1/2015
WO   WO-2015013175 A3   1/2015

OTHER PUBLICATIONS

"International Application Serial No. PCT/US2014/047390, International Search Report mailed Nov. 13, 2014", 2 pgs.
(Continued)

*Primary Examiner* — Chi Q Nguyen
(74) *Attorney, Agent, or Firm* — Schwegman Lundberg & Woessner, P.A.

(57) ABSTRACT

An auxiliary tractor seat for providing additional seating in a tractor cabin is provided herein. The auxiliary tractor seat includes a mounting plate defining one or more mounting holes, configured to receive an auxiliary tractor seat bolt, so as to couple the auxiliary tractor seat to tractor seat. A base plate is coupled to the mounting plate so as to provide a substantially flat seating surface. A lower seat back coupled to at least one of the mounting plate and the base plate, an upper seat back at least partially disposed above the lower seat back, and a hinge coupled to the lower seat back and the upper seat back so as to permit the upper seat back to transition from an upright position to a horizontal position.
(Continued)

The auxiliary tractor seat is coupled to the tractor seat such that suspension supports the auxiliary seat and provides shock absorption.

19 Claims, 5 Drawing Sheets

(51) Int. Cl.
*B60N 2/01* (2006.01)
*B60N 2/46* (2006.01)
*B60N 2/20* (2006.01)
*B60N 2/50* (2006.01)
*B60N 2/39* (2006.01)
*B60N 2/68* (2006.01)
*B60N 2/04* (2006.01)
*E02F 9/16* (2006.01)
*B60N 2/06* (2006.01)

(52) U.S. Cl.
CPC .............. *B60N 2/502* (2013.01); *B60N 2/682* (2013.01); *B60N 2/04* (2013.01); *B60N 2/06* (2013.01); *B60N 2/39* (2013.01); *B60N 2002/684* (2013.01); *B60N 2205/00* (2013.01); *B60N 2205/30* (2013.01); *E02F 9/166* (2013.01)

(58) Field of Classification Search
USPC ............. 297/344.1, 248; 180/326, 334, 900; 74/471 R
See application file for complete search history.

(56) References Cited

U.S. PATENT DOCUMENTS

| | | | | |
|---|---|---|---|---|
| 4,322,052 | A * | 3/1982 | Hodge | B60N 2/203 180/330 |
| 5,076,528 | A * | 12/1991 | VanDuser | B60N 2/0705 248/419 |
| 5,797,649 | A * | 8/1998 | Snell, Jr. | B60N 2/3043 296/63 |
| 5,938,282 | A * | 8/1999 | Epple | B60N 2/4693 180/315 |
| 6,129,403 | A | 10/2000 | Townsend | |
| 6,164,285 | A * | 12/2000 | Garberg | B60K 20/00 180/324 |
| 6,715,825 | B2 * | 4/2004 | Tame | B60N 2/34 297/101 |
| 7,014,255 | B2 * | 3/2006 | Amamiya | B60N 2/143 180/329 |
| 7,726,745 | B2 * | 6/2010 | Bruns | A47C 7/54 297/411.36 |
| 8,632,043 | B2 * | 1/2014 | Dahlbacka | B60N 2/07 248/221.11 |
| 2003/0184123 | A1 * | 10/2003 | Amamiya | B60N 2/143 296/190.01 |
| 2008/0143161 | A1 * | 6/2008 | Ayabe | B60N 2/06 297/344.24 |
| 2010/0148561 | A1 | 6/2010 | Runde | |
| 2011/0127819 | A1 | 6/2011 | Wada | |

OTHER PUBLICATIONS

"International Application Serial No. PCT/US2014/047390, Written Opinion mailed Nov. 13, 2014", 7 pgs.

* cited by examiner

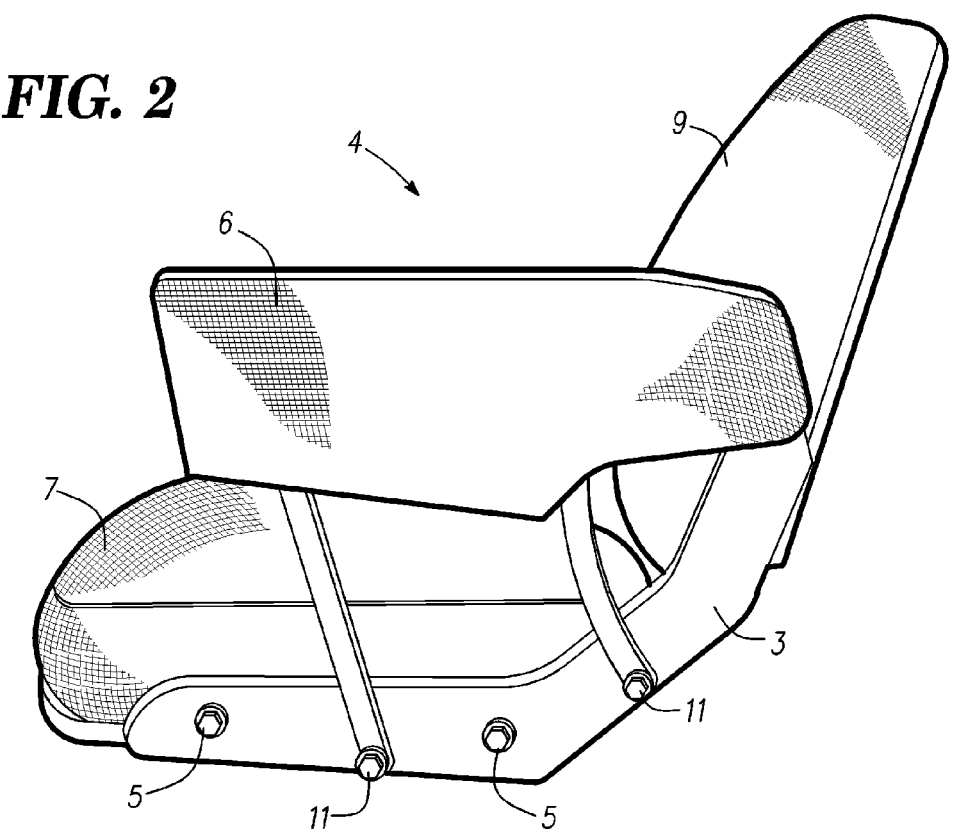
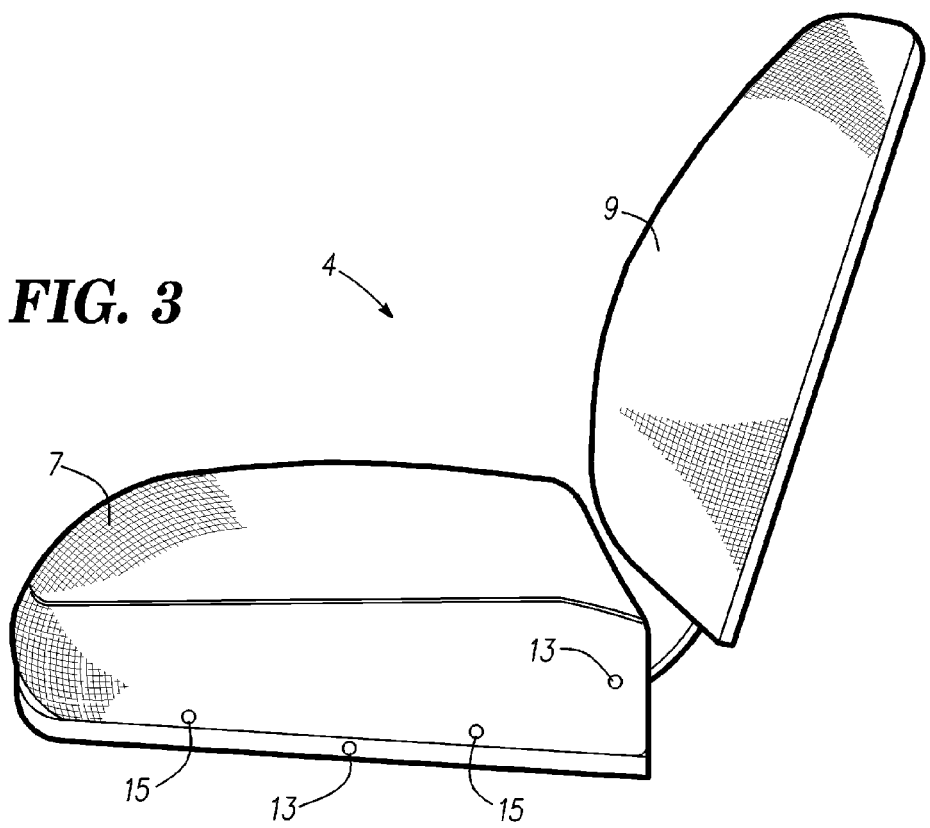

80 ↘

```
┌─────────────────────────────────────────┐
│ REMOVE THE ARM FROM THE TRACTOR SEAT BY │
│ REMOVING ONE OR MORE BOLTS COUPLING THE │─82
│ ARM REST TO THE TRACTOR SEAT FRAME      │
│ THROUGH ONE OR MORE FRAME HOLES OF THE  │
│ FRAME                                   │
└─────────────────────────────────────────┘
                    ↓
┌─────────────────────────────────────────┐
│ INSTALL THE AUXILIARY SEAT BY MOUNTING A│
│ MOUNTING PLATE OF THE AUXILIARY SEAT TO │
│ THE TRACTOR SEAT USING ONE OR MORE      │─84
│ MOUNTING HOLES OF THE MOUNTING PLATE,   │
│ AT LEAST ONE OF THE ONE OR MORE MOUNTING│
│ HOLES ASSOCIATED WITH ONE OF THE ONE OR │
│ MORE FRAME HOLES                        │
└─────────────────────────────────────────┘
```

*FIG. 8*

AUXILIARY TRACTOR SEAT

CLAIM OF PRIORITY

This application is a U.S. National Stage Filing under 35 U.S.C 371 from International Application Serial No. PCT/US2014/047390, filed Jul. 21, 2014, which application claims the benefit of U.S. Patent Application Ser. No. 61/857,058, filed on Jul. 22, 2013, the benefit of priority of which is claimed hereby, and which applications are incorporated herein by reference in their entirety.

TECHNICAL FIELD

This document pertains generally, but not by way of limitation, to auxiliary tractor seats and methods of installing the same.

BACKGROUND

Tractor cabins generally include controls for operating a tractor and a tractor seat configured to seat one operator while operating the tractor. In one example, the tractor seat includes a seating area and one or more arm rests for providing comfort to the operator. The one or more arm rests, in some instances, rotate between an up and a down position, permitting the operator to more easily get in and out of the tractor seat. In one example, the tractor seat includes a shock absorber to further provide comfort to the operator.

OVERVIEW

The present inventor has recognized, among other things, that a problem to be solved can include providing seating for more than one operator or a passenger in a tractor cabin. In an example, the present subject matter can provide a solution to this problem, such as by an auxiliary tractor seat that provides seating to a second operator or a passenger. Stated another way, the auxiliary tractor seat utilizes the pre-existing tractor seat to provide additional seating within the tractor cabin.

In one example, the apparatuses, systems, or methods described herein provide additional seating in a tractor cabin. Such apparatuses, systems, and methods utilize pre-existing structure of the tractor cabin, such as a tractor seat, frame, or suspension. Further, the present auxiliary tractor seat provides additional seating during normal tractor operations, such as a ride-along, harvesting, planting, or the like.

The present inventor has further recognized that a problem to be solved can include providing additional seating in a tractor cabin while minimizing discomfort experienced by the operator during operation of the tractor. For example, previous additional seating apparatuses that permanently removed an arm rest from the tractor seat or reduced the seating area for the operator encumbered the overall comfort of the operator. During harvesting or planting, an operator typically works greater than 12 hours operating the tractor; consequently, operator comfort is important.

The present disclosure provides auxiliary tractor cabin seating without permanently removing an arm rest for the tractor seat or reducing the seating area for the operator. The auxiliary tractor seat, provided herein, is attached to the existing tractor seat, without removing the seating area of the operator. Further, when not in use as additional seating, the auxiliary tractor seat can be modified to act as an arm rest for the operator. The auxiliary seat described herein, is easily modifiable between the arm rest function and the seating function.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 is a perspective view of one example of a tractor seat with an arm rest.

FIG. 3 is a perspective view of the tractor seat of FIG. 2 with the arm rest removed.

FIG. 8 is one example of a method for installing an auxiliary tractor seat.

DETAILED DESCRIPTION

Figure 1:
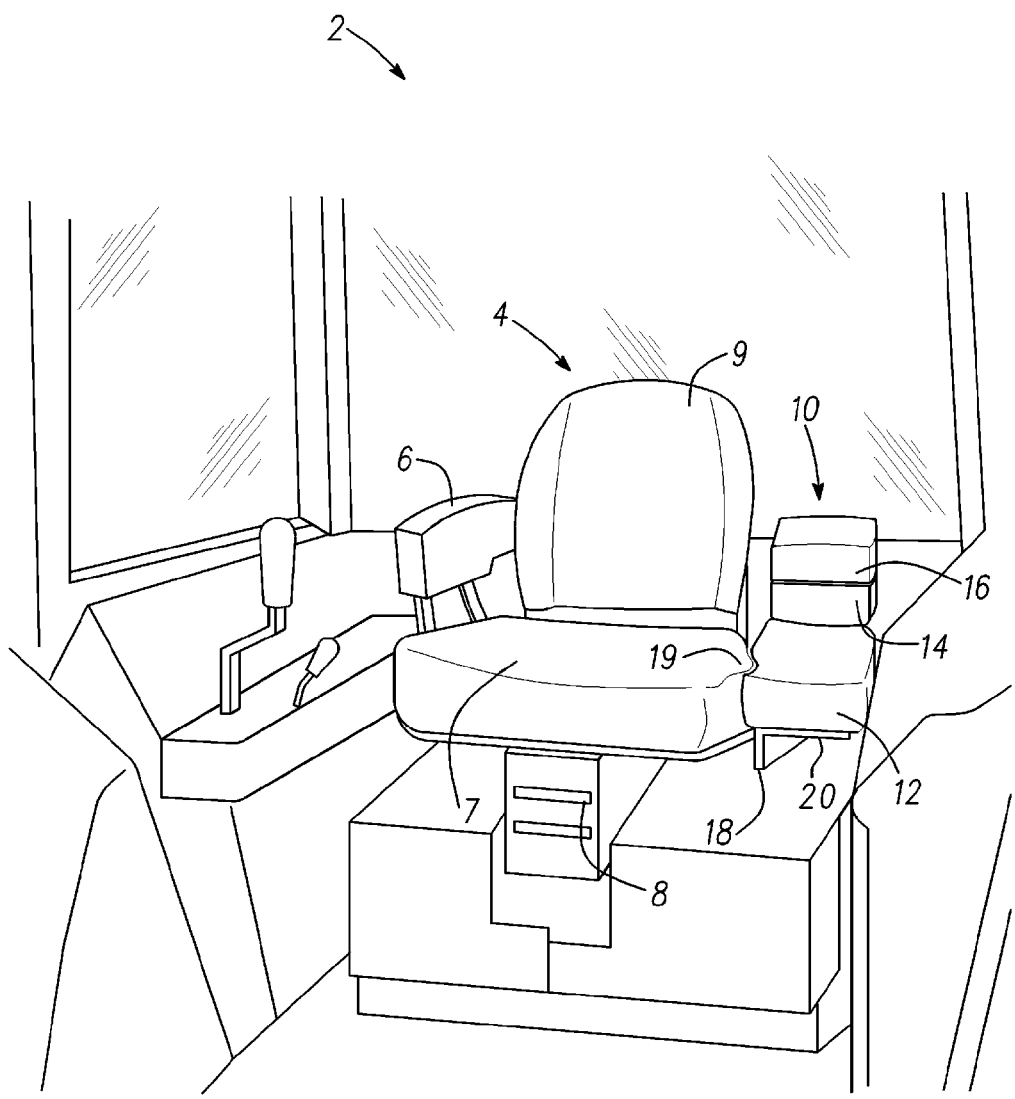
FIG. 1 is perspective view of one example of a tractor cabin including an auxiliary tractor seat.

FIG. 1 shows one example of a tractor cabin, such as tractor cabin 2. As shown, the tractor cabin 2 includes a tractor seat 4, including a tractor seat cushion 7 and a tractor seat back cushion 9, and an auxiliary tractor seat 10. In an example, the tractor seat cushion 7 includes a profile 19. The tractor seat profile 19 can include a variety of shapes, such as a taper from a generally front portion of the tractor seat cushion 7 toward the tractor seat back cushion 9, a protrusion, or any other geometry. In an example, the tractor seat 4 includes a suspension 8, so as to provide shock absorption to the tractor seat 4 during operation of the tractor, such that general overall operator comfort is increased. As shown, the tractor seat 4 includes one or more arm rests 6. The one or more arm rests 6, in an example, are fixably coupled to the tractor seat 4 by one or more bolts.

The auxiliary tractor seat 10 includes a mounting plate 18 and a base plate 20 coupled to the mounting plate 18. The mounting plate 18 is configured to be coupled to the tractor seat 4 as described herein. In one example, the auxiliary seat 10 includes an auxiliary seat cushion 12, an auxiliary seat back cushion 14, and an auxiliary arm rest cushion 16. The auxiliary tractor seat 10, in an example, replaces one of the one or more arm rests 6. In an example, the auxiliary seat cushion 12 has a corresponding profile to the tractor seat cushion 7 profile 19.

FIG. 2 shows one example of a tractor seat 4 including an arm rest 6. The tractor seat 4 includes a frame 3 configured to couple a frame 3 to the tractor seat 4. For example, one or more frame bolts 5 are received by one or more corresponding frame bolt receiving holes, defined by the frame 3, so as to couple the frame 3 to the tractor seat 4. In an example, the tractor seat 4 includes one or more arm rest arm rest bolts 11 configured to couple the arm rest 6 to the tractor seat 4. The one or more arm rest bolts 11 and one or more frame bolts 5 include at least one of a compression fitting, a threadably engaged fitting, a snap fitting, a taper fitting, a press fitting, or a combination thereof. Although not shown in FIG. 2, the tractor seat 4, in one example, includes a suspension system 8.

FIG. 3 shows one example of a tractor seat 4 with the arm rest 6 of FIG. 2 removed. In an example, the frame 3 is connected by a frame bolt 5, so as to permit the frame 3 to hang free from the tractor seat 4. In one example, the tractor seat 4 includes one or more frame bolt receiving holes 15 configured to receive corresponding frame bolts 5. Further, the tractor seat 4 includes one or more arm rest bolt receiving holes 13 configured to receive corresponding arm rest bolts 11.

Figure 4:
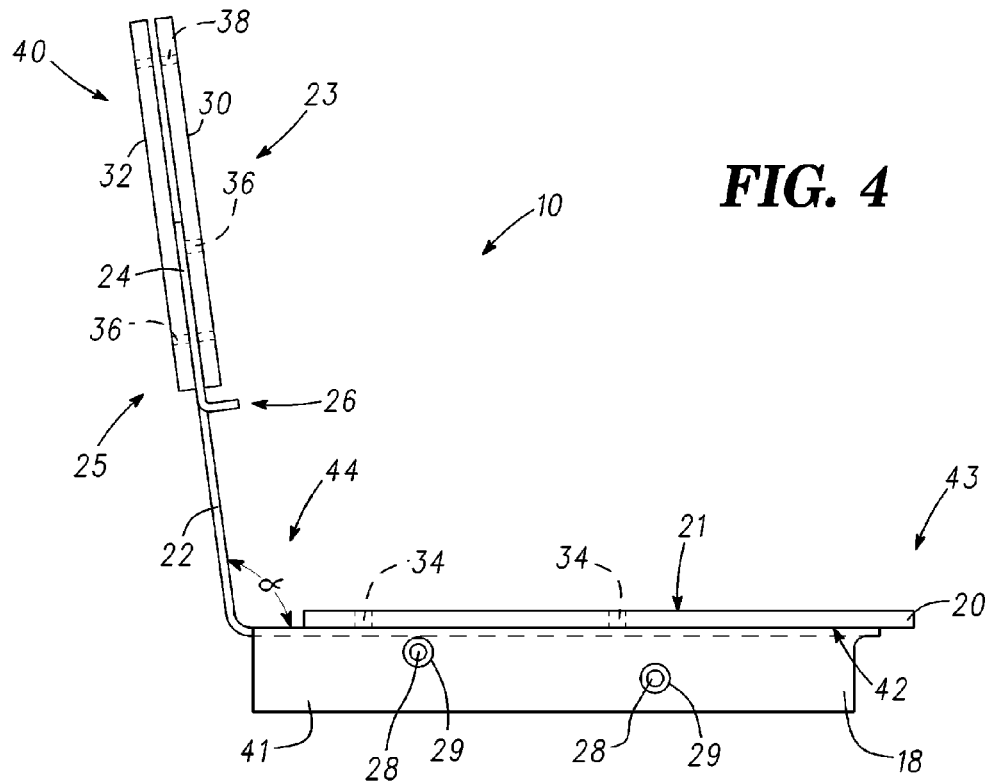
FIG. 4 is a side perspective view of an auxiliary tractor seat in an upright position.

Referring now to FIG. 4, one example of an auxiliary tractor seat 10 in an upright position is provided. The auxiliary seat cushion 12, the auxiliary seat back cushion 14, and the auxiliary arm rest cushion 16, as shown in FIG. 1, are not shown in FIG. 4 to better illustrate an exemplary construction of the auxiliary tractor seat 10. The auxiliary tractor seat 10 includes a mounting plate 18 defining one or more mounting holes 28. A mounting plate surface 41 is configured to abut or at least partially contact the tractor seat 4 or frame 3, such that one or more auxiliary tractor seat bolts are received by the one or more mounting plate holes 28 to couple the auxiliary tractor seat 10 to the tractor seat 4. In an example, at least one mounting plate hole 28 is further defined by a protrusion 29, such that the protrusion 29 is received by a pre-existing tractor seat hole, such as the pre-existing arm rest bolt holes 13 or the pre-existing frame bolt holes 15.

The mounting plate 18 includes a base plate receiving surface 42. In an example, the base plate receiving surface 42 is substantially parallel to a floor of the tractor cabin 2, substantially level to an upper surface of the tractor seat cushion 7, substantially parallel to the upper surface of the tractor seat cushion 7, angled to at least one of the floor of the tractor cabin or the upper surface of the tractor seat cushion 7, off set, such as above or below, the upper surface of the tractor seat cushion 7, or any combination thereof. The base plate receiving surface 42 is configured to receive a base plate 20, including a surface 21 configured to receive the auxiliary tractor seat cushion 12. In an example, the base plate 20 is coupled to the mounting plate 18 by one or more fasteners, such as a screw, bolt, pin, or the like, inserted in base plate mounting holes 34. In an example, the base plate 20 is welded to the base plate receiving surface 42, such as, but not limited to, arc welding, gas welding, resistance welding, energy beam welding, or solid-state welding. In a further example, the base plate receiving surface 42 is configured to receive the auxiliary seat cushion 12. In such an example, the base plate receiving surface 42 is configured to perform the functions of the base plate 20.

In an example, the base plate 20 is coupled offset to the mounting plate 18 so as define a front most portion 43 of the auxiliary tractor seat 10. For example, the front portion 43 includes a portion of the base plate 20 that extends beyond the mounting plate 18 in a direction opposite a lower seat back 22. In such an example, the base plate 20 provides a cushion receiving space 44 between the base plate 20 and a lower back rest 22, such that the auxiliary seat back cushion 14 is received in the cushion receiving space 44. Benefits of such an example include providing a configuration that allows a cushion to extend the full length of a passenger's lower back, such that better back support is provided.

The lower back rest 22 and upper seat back 24 form an auxiliary seat back 40. In an example, the lower back rest 22 is coupled to at least one of the mounting plate 18 or the base plate 20. As shown in FIG. 4, the lower back rest 22 is coupled to the mounting plate 18. In an example, the lower back rest 22 and mounting plate 18 are a unitary structure, such that they are not welding together. The lower back rest 22 forms an angle α with the mounting plate 18, so as to define an angle between the base plate receiving surface 42 or the base plate 20 of the mounting plate 18. The angle α can include any suitable angle such as ranging from about 60 degrees to about 120 degrees relative to the mounting plate 18 or base plate 20. In an example the auxiliary tractor seat 10 can include a ratchet or movable pin locking system configured to change the angle α according to a user preference and/or a specific tractor cab 2 configuration.

The auxiliary seat back 40 includes the upper seat back 24 at least partially disposed above the lower seat back 22 and coupled to the lower seat back 22 by a hinge 26, described herein. In an example, the auxiliary tractor seat 10 includes an auxiliary back support 30 coupled to at least a portion of a front surface of the upper back support 24 and at least partially disposed above the upper back support 24. The auxiliary back support 30 is configured to receive the auxiliary seat back cushion 14. In an example, the auxiliary back support 30 is coupled to the upper back support 24 by a fastener, as described herein, such as by fastener holes or pins 36, so as to snap fit, press fit, or threadably engage the auxiliary back support 30 and upper back support 24. In an example, the auxiliary back support 30 is welded, as described herein, to the upper back support 24.

The auxiliary arm rest 10 includes an auxiliary arm rest support 32 coupled to at least a portion of a back surface of the upper back support 24 and at least partially disposed above the upper back support 24. The auxiliary arm rest support 32 is configured to receive an arm rest cushion, so as to provide an arm rest when the upper back support 24 is rotated into the horizontal position.

Figure 5:
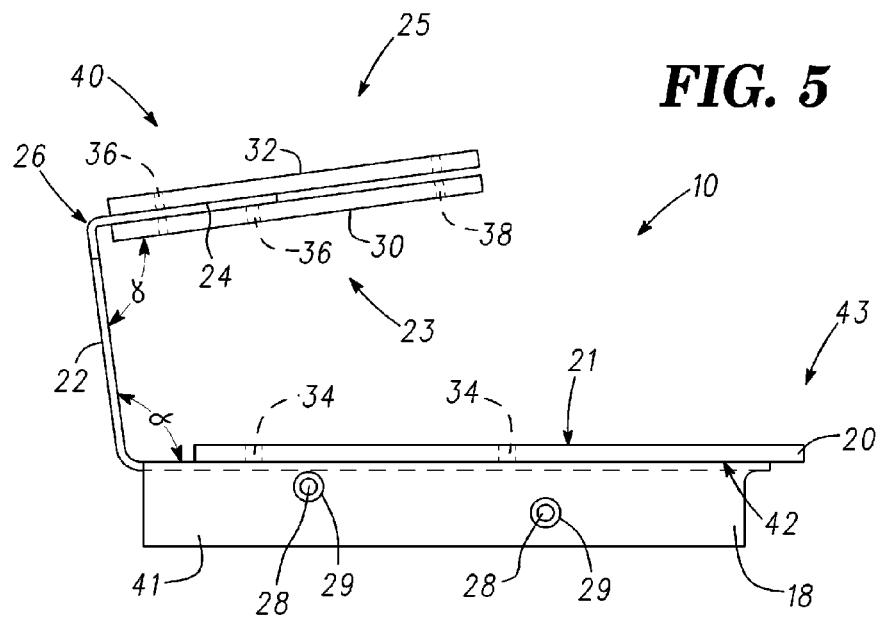
FIG. 5 is a side perspective view of the auxiliary tractor seat of FIG. 4 in a horizontal position.

FIG. 5 shows one example of the auxiliary tractor seat 4 in a horizontal position. The hinge 26 is configured to rotate the upper back support 24, including, in one example, the auxiliary back support 30 and auxiliary arm rest support 32, relative to the lower seat back 22, such that the front portion of the upper back support 24 faces the base plate 20 or auxiliary tractor seat cushion 12. In one example, the hinge 26 is configured to rotate the upper back support 24 at an angle γ relative to the lower seat back 22. The hinge 26 is configured to provide the angle γ ranging from about 60 degrees to about 120 degrees relative to the lower seat back 22. In one example, the angle γ is substantially 90 degrees. Further, in one example, the lower seat back 22 includes a cut out disposed below the hinge 26 such that the auxiliary seat back cushion 12 is received by the cut out, so as to permit a greater angle γ in the horizontal position.

Figure 6:
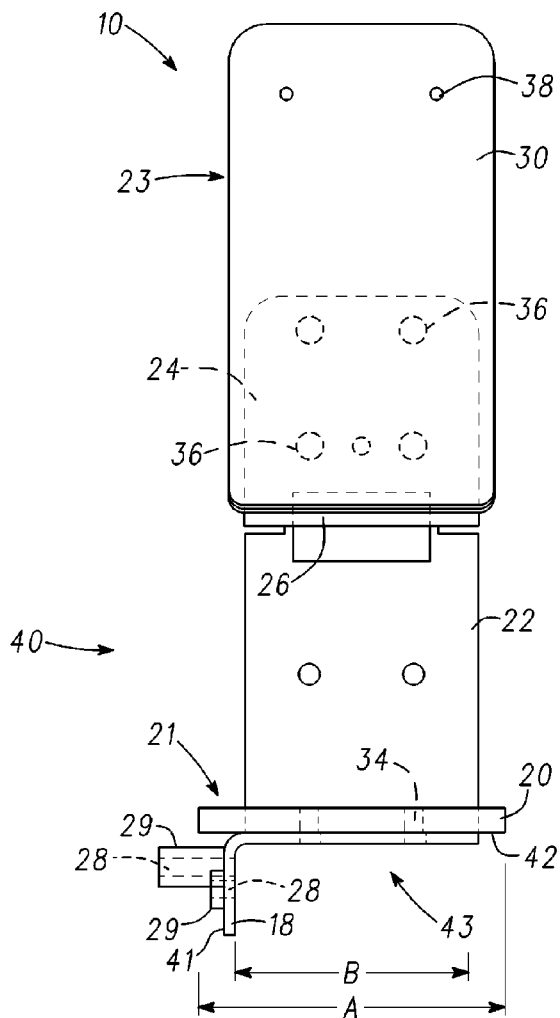
FIG. 6 is a front perspective view of one example of an auxiliary tractor seat.

Referencing FIG. 6, a partial section view of the auxiliary tractor seat 10 is shown without the auxiliary cushions. The mounting plate 18, in an example, is "L-shaped", such that the mounting plate surface 41 and the base plate receiving surface 42 are substantially 90 degrees relative to one another. In an example, a width of the base plate receiving surface A is less than a width of the base plate B. In such an example, the base plate width B is configured to overhang at least one lateral edge of the base plate receiving surface 42. As described herein, the base plate 20 is coupled to the mounting plate 18 by the one or more base plate mounting holes 34. The mounting plate surface 41 includes the mounting plate holes 28 defined by the protrusions 29, such that the protrusions 29 are received by a pre-existing tractor seat hole, such as the pre-existing arm rest bolt holes 13 or the pre-existing frame bolt holes 15. The mounting plate hole 28 forms a bore the length of the protrusion 29, such as a threaded bore, non-threaded bore, tapered bore, non-tapered bore, or a combination thereof, configured to receive the one or more frame bolts 5. The mounting plate surface 41 is configured to be substantially flush with the frame 6 or tractor seat 4 when the auxiliary tractor seat 10 is installed.

As shown in FIG. 6, upper back support 24 is coupled to the auxiliary back support 30, such that the auxiliary back support 30 is as least partially disposed above the upper back support 24. Such a configuration provides the benefit of permitting the auxiliary tractor seat 10 to be modular according to a tractor cabin configuration. For example, a length of the auxiliary back support 30 is determined according to a back support clearance for the auxiliary tractor seat 30.

Figure 7:
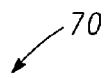
FIG. 7 is one example of a method for installing an auxiliary tractor seat.

FIG. 7 shows a block diagram illustrating one example of a method 70 for installing an auxiliary tractor seat, such as auxiliary tractor seat 10. In describing the method 70 reference is made to features and elements previously described herein, including numbered references. Numbered elements provided within the description of the method 70 are not intended to be limiting, instead numbered references are provided for convenience and further include any similar features described herein, as well as their equivalents. At 72, one or more arm rest bolts coupling 11 an arm rest 6 and a tractor seat 4 are removed, such as by a wrench, drill, or similar device.

At 74, one or more frame bolts 5 coupling the tractor seat 4 and a frame 3 are removed, such as described herein. In an example, the arm rest 6 of the tractor seat 4 is decoupled. The frame 3 is configured to couple to the tractor seat 4 so as to mount the arm rest 6 to the tractor seat 4. At 76, a mounting plate 18 of an auxiliary tractor seat 10 is aligned with one or more pre-existing tractor seat holes 13 and 15 associated with at least one of the one or more arm rest bolts 11 or the one or more frame bolts 5. In an example, aligning the mounting plate 18 includes inserting one or more protrusions 29 defining the one or more mounting holes 28 at least partially in one or more pre-existing tractor seat holes 13 and 15 associate with the one or more arm rest bolts 11 or the one or more frame bolts 5. A mounting plate surface 41 can be mounted at least substantially flush with the tractor seat 4 or the frame 3.

At 78, the mounting plate 18 of the auxiliary tractor seat 10 is coupled to the tractor seat 4 with one or more auxiliary tractor seat bolts. In an example, coupling the mounting plate 18 includes coupling the frame 3 to the tractor seat 4 with the one or more auxiliary tractor seat bolts, wherein the frame 3 is at least partially disposed between the tractor seat 4 and the mounting plate 18, such as the mounting plate surface 41. In one example, the tractor seat 4 includes a suspension 8 coupled to the tractor seat 4 and a tractor, wherein coupling the mounting plate 18 comprises coupling the mounting plate 18 to the tractor seat frame 3 without directly coupling the auxiliary tractor seat 10 to the tractor so that the suspension 8 supports the auxiliary tractor seat 10 and provides shock absorption to the auxiliary tractor seat 10.

FIG. 8 shows a block diagram illustrating one example of a method 80 for installing an auxiliary tractor seat, such as auxiliary tractor seat 10. At 82, the arm rest 6 is removed from the tractor seat 4 by removing one or more bolts 11 coupling the arm rest 6 to the tractor seat frame 3 through one or more frame holes 13 and 15 of the frame 3. At 84, the auxiliary tractor seat 10 is installed by mounting a mounting plate 18 of the auxiliary tractor seat 10 to the tractor seat 4 using one or more mounting plate holes 28 of the mounting plate 18, at least one of the one or more mounting plate holes 28 associated with one of the one or more frame holes 13 and 15. Installing the auxiliary tractor seat 10 includes mounting the mounting plate 18 to the tractor seat 4 without directly coupling the auxiliary tractor seat 10 to the tractor so that the suspension 8 supports the auxiliary tractor seat 10 and provides shock absorption to the auxiliary tractor seat 10.

VARIOUS NOTES & EXAMPLES

Example 1 can include subject matter (such as an apparatus, a method, a means for performing acts, or a machine readable medium including instructions that, when performed by the machine, that can cause the machine to perform acts), such as a method of installing an auxiliary tractor seat, comprising: removing one or more arm rest bolts coupling an arm rest and a tractor seat; removing one or more frame bolts coupling the tractor seat and a frame, the frame configured to couple to the tractor seat so as to mount the arm rest to the tractor seat; aligning a mounting plate of an auxiliary tractor seat with one or more pre-existing tractor seat holes associated with at least one of the one or more arm rest bolts or the one or more frame bolts; and coupling the mounting plate of the auxiliary tractor seat to the tractor seat with one or more auxiliary tractor seat bolts.

Example 2 can include, or can optionally be combined with the subject matter of Example 1 to optionally include wherein aligning the mounting plate includes aligning one or more mounting plate holes of the mounting plate with one or more frame holes corresponding to the one or more pre-existing tractor seat holes associated with the one or more frame bolts.

Example 3 can include, or can optionally be combined with the subject matter of one or any combination of Examples 1 or 2 to optionally include wherein coupling the mounting plate includes coupling the frame to the tractor seat with the one or more auxiliary tractor seat bolts, wherein the frame is at least partially disposed between the tractor seat and the mounting plate.

Example 4 can include, or can optionally be combined with the subject matter of one or any combination of Examples 1-3 to optionally include wherein the one or more pre-existing tractor seat holes associated with the one or more frame bolts are in an alternating pattern with the one or more pre-existing tractor seat holes associated with the one or more arm rest bolts.

Example 5 can include, or can optionally be combined with the subject matter of one or any combination of Examples 1-4 to optionally include decoupling the arm rest from the tractor seat.

Example 6 can include, or can optionally be combined with the subject matter of one or any combination of Examples 1-5 to optionally include wherein the tractor seat includes a suspension coupled to the tractor seat and a tractor, wherein coupling the mounting plate comprises coupling the mounting plate to the tractor seat frame without directly coupling the auxiliary tractor seat to the tractor so that the suspension supports the auxiliary seat and provides shock absorption to the auxiliary tractor seat.

Example 7 can include subject matter (such as an apparatus, a method, a means for performing acts, or a machine readable medium including instructions that, when performed by the machine, that can cause the machine to perform acts), such as an auxiliary tractor seat for use with a tractor seat mounted to the tractor using a suspension, comprising: a mounting plate defining one or more mounting holes, at least one of the one or more mounting holes configured to receive an auxiliary tractor seat bolt so as to couple an auxiliary tractor seat to a tractor seat; a base plate configured to provide a substantially flat seating surface coupled to the mounting plate; and a seat back, including: a lower seat back coupled to at least one of the mounting plate and the base plate, an upper seat back at least partially disposed above the lower seat back, a hinge coupled to the lower seat back and the upper seat back and configured to permit the upper seat back to transition from an upright position to a horizontal position, and wherein the mounting plate is configured to couple the auxiliary tractor seat to the tractor seat without directly coupling the auxiliary tractor seat to the tractor so that the suspension can support the auxiliary seat and provide shock absorption to the auxiliary tractor seat.

Example 8 can include, or can optionally be combined with the subject matter of Example 7 to optionally include wherein at least one of the one or more mounting holes is configured to correspond to a frame hole of the tractor seat.

Example 9 can include, or can optionally be combined with the subject matter of one or any combination of Examples 7 or 8 to optionally include one or more protrusions, wherein each protrusion defines an corresponds to a one of the one or more mounting holes, the one or more protrusions configured to be received by a corresponding frame hole of the tractor seat.

Example 10 can include, or can optionally be combined with the subject matter of one or any combination of Examples 7-9 to optionally include wherein the lower seat back is coupled to at least one of the mounting plate and the base plate at an angle of about 80 degrees or greater.

Example 11 can include, or can optionally be combined with the subject matter of one or any combination of Examples 7-10 to optionally include wherein the hinge is configured to rotate the upper seat back about 90 degrees relative to the lower seat back.

Example 12 can include, or can optionally be combined with the subject matter of one or any combination of Examples 7-11 to optionally include an auxiliary seat cushion coupled to the seating surface of the base plate.

Example 13 can include, or can optionally be combined with the subject matter of one or any combination of Examples 7-12 to optionally include an auxiliary seat back cushion coupled to a front surface of the upper seat back and an auxiliary arm rest cushion coupled to a back surface of the upper seat back.

Example 14 can include, or can optionally be combined with the subject matter of one or any combination of Examples 7-13 to optionally include wherein the auxiliary arm rest cushion is firmer than the auxiliary seat cushion.

Example 15 can include, or can optionally be combined with the subject matter of one or any combination of Examples 7-14 to optionally include wherein the auxiliary tractor seat is configured to operate as an arm rest when the upper seat back is in the horizontal position.

Example 16 can include subject matter (such as an apparatus, a method, a means for performing acts, or a machine readable medium including instructions that, when performed by the machine, that can cause the machine to perform acts), such as a system for a assembling an auxiliary tractor seat on a pre-existing tractor seat mounted to a tractor using a suspension, the pre-existing tractor seat including a frame defining one or more frame holes each corresponding to a respective tractor seat hole of the pre-existing tractor seat, including one or more bolts configured to be received by the one or more frame holes and the respective one or more tractor seat hole so as to couple the frame to the pre-existing tractor seat, comprising: an auxiliary tractor seat configured to be coupled to the pre-existing tractor seat, including: a mounting plate defining one or more mounting holes, at least one of the one or more mounting holes configured to receive one of the one or more bolts so as to couple the auxiliary tractor seat to the tractor seat, each of the one or more mounting holes configured to correspond to respective one of the one or more frame holes, wherein the frame is configured to be at least partially disposed between the pre-existing tractor seat and the auxiliary tractor seat; a base plate configured to provide a substantially flat seating surface coupled to the mounting plate; and a seat back, including: a lower seat back coupled to at least one of the mounting plate and the base plate, an upper seat back at least partially disposed above the lower seat back, and a hinge coupled to the lower seat back and the upper seat back, the hinge configured to permit the upper seat back to transition from an upright position to a horizontal position; and wherein the mounting plate is configured to support the auxiliary tractor seat on the tractor seat without directly coupling the auxiliary tractor seat to the tractor so that the suspension can support the auxiliary seat and provide shock absorption to the auxiliary tractor seat.

Example 17 can include, or can optionally be combined with the subject matter of Example 16 to optionally include wherein the auxiliary tractor seat is configured to operate as an arm rest when the upper seat back is in a horizontal position.

Example 18 can include, or can optionally be combined with the subject matter of one or any combination of Examples 16 or 17 to optionally include wherein the hinge is configured to rotate the upper seat back about 90 degrees relative to the lower seat back.

Example 19 can include, or can optionally be combined with the subject matter of one or any combination of Examples 16-18 to optionally include a suspension of the tractor seat, wherein the auxiliary tractor seat is configured to utilize the suspension to provide shock absorption to the auxiliary tractor seat.

Example 20 can include subject matter (such as an apparatus, a method, a means for performing acts, or a machine readable medium including instructions that, when performed by the machine, that can cause the machine to perform acts), such as a method of installing an auxiliary seat in a tractor having a tractor seat mounted to the tractor with a suspension, the tractor seat including a frame and an arm rest mounted on the frame, the method comprising: removing the arm rest from the tractor seat by removing one or more bolts coupling the arm rest to the tractor seat frame through one or more frame holes of the frame; and installing the auxiliary seat by mounting a mounting plate of the auxiliary seat to the tractor seat using one or more mounting holes of the mounting plate, at least one of the one or more mounting holes associated with one of the one or more frame holes; and wherein installing the auxiliary seat comprises mounting the mounting plate to the tractor seat without directly coupling the auxiliary tractor seat to the tractor so that the suspension supports the auxiliary seat and provides shock absorption to the auxiliary tractor seat.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of installing an auxiliary tractor seat, comprising:
   removing one or more arm rest bolts coupling an arm rest and a tractor seat;
   removing one or more frame bolts coupling the tractor seat and a frame, the frame configured to couple to the tractor seat so as to mount the arm rest to the tractor seat;
   aligning a mounting plate of an auxiliary tractor seat with one or more pre-existing tractor seat holes associated with at least one of the one or more arm rest bolts or the one or more frame bolts; and a seat back including a lower seat back coupled to at the mounting plate and the base plate, an upper seat back at least partially disposed above the lower back, a hinge coupled to the lower seat back and the upper seat back and configured to permit the upper seat back to transition from an upright to a horizontal position
   coupling the mounting plate of the auxiliary tractor seat to the tractor seat with one or more auxiliary tractor seat bolts.

2. The method of claim 1, wherein aligning the mounting plate includes aligning one or more mounting plate holes of the mounting plate with one or more frame holes corresponding to the one or more pre-existing tractor seat holes associated with the one or more frame bolts.

3. The method of claim 2, wherein coupling the mounting plate includes coupling the frame to the tractor seat with the one or more auxiliary tractor seat bolts, wherein the frame is at least partially disposed between the tractor seat and the mounting plate.

4. The method of claim 1, wherein the one or more pre-existing tractor seat holes associated with the one or more frame bolts are in an alternating pattern with the one or more pre-existing tractor seat holes associated with the one or more arm rest bolts.

5. The method of claim 1, comprising decoupling the arm rest from the tractor seat.

6. The method of claim 1, wherein the tractor seat includes a suspension coupled to the tractor seat and a tractor, wherein coupling the mounting plate comprises coupling the mounting plate to the tractor seat frame without directly coupling the auxiliary tractor seat to the tractor so that the suspension supports the auxiliary seat and provides shock absorption to the auxiliary tractor seat.

7. An auxiliary tractor seat for use with a tractor seat mounted to the tractor using a suspension, comprising:
   a mounting plate defining one or more mounting holes, at least one of the one or more mounting holes configured to receive an auxiliary tractor seat bolt so as to couple an auxiliary tractor seat to a tractor seat;
   a base plate configured to provide a substantially flat seating surface coupled to the mounting plate; and
   a seat back, including:
      a lower seat back coupled to at least one of the mounting plate and the base plate, an upper seat back at least partially disposed above the lower seat back, a hinge coupled to the lower seat back and the upper seat back and configured to permit the upper seat back to transition from an upright position to a horizontal position, and wherein the mounting plate is configured to couple the auxiliary tractor seat to the tractor seat without directly coupling the auxiliary tractor seat to the tractor so that the suspension can support the auxiliary seat and provide shock absorption to the auxiliary tractor seat.

8. The auxiliary tractor seat of claim 7, wherein at least one of the one or more mounting holes is configured to correspond to a frame hole of the tractor seat.

9. The auxiliary tractor seat of claim 7, comprising one or more protrusions, wherein each protrusion defines an corresponds to a one of the one or more mounting holes, the one or more protrusions configured to be received by a corresponding frame hole of the tractor seat.

10. The auxiliary tractor seat of claim 7, wherein the lower seat back is coupled to at least one of the mounting plate and the base plate at an angle of about 80 degrees or greater.

11. The auxiliary tractor seat of claim 7, wherein the hinge is configured to rotate the upper seat back about 90 degrees relative to the lower seat back.

12. The auxiliary tractor seat of claim 7, comprising an auxiliary seat cushion coupled to the seating surface of the base plate.

13. The auxiliary tractor seat of claim 7, comprising an auxiliary seat back cushion coupled to a front surface of the upper seat back and an auxiliary arm rest cushion coupled to a back surface of the upper seat back.

14. The auxiliary tractor seat of claim 13, wherein the auxiliary arm rest cushion is firmer than the auxiliary seat cushion.

15. The auxiliary tractor seat of claim 7, wherein the auxiliary tractor seat is configured to operate as an arm rest when the upper seat back is in the horizontal position.

16. A system for a assembling an auxiliary tractor seat on a pre-existing tractor seat mounted to a tractor using a suspension, the pre-existing tractor seat including a frame defining one or more frame holes each corresponding to a respective tractor seat hole of the pre-existing tractor seat, including one or more bolts configured to be received by the one or more frame holes and the respective one or more tractor seat hole so as to couple the frame to the pre-existing tractor seat, comprising:

an auxiliary tractor seat configured to be coupled to the pre-existing tractor seat, including:

a mounting plate defining one or more mounting holes, at least one of the one or more mounting holes configured to receive one of the one or more bolts so as to couple the auxiliary tractor seat to the tractor seat, each of the one or more mounting holes configured to correspond to respective one of the one or more frame holes, wherein the frame is configured to be at least partially disposed between the pre-existing tractor seat and the auxiliary tractor seat;

a base plate configured to provide a substantially flat seating surface coupled to the mounting plate; and a seat back, including:

a lower seat back coupled to at least one of the mounting plate and the base plate, an upper seat back at least partially disposed above the lower seat back, and a hinge coupled to the lower seat back and the upper seat back, the hinge configured to permit the upper seat back to transition from an upright position to a horizontal position; and wherein the mounting plate is configured to support the auxiliary tractor seat on the tractor seat without directly coupling the auxiliary tractor seat to the tractor so that the suspension can support the auxiliary seat and provide shock absorption to the auxiliary tractor seat.

17. The system of claim 16, wherein the auxiliary tractor seat is configured to operate as an arm rest when the upper seat back is in a horizontal position.

18. The system of claim 16, wherein the hinge is configured to rotate the upper seat back about 90 degrees relative to the lower seat back.

19. The system of claim 16, comprising a suspension of the tractor seat, wherein the auxiliary tractor seat is configured to utilize the suspension to provide shock absorption to the auxiliary tractor seat.

\* \* \* \* \*

UNITED STATES PATENT AND TRADEMARK OFFICE
CERTIFICATE OF CORRECTION

PATENT NO. : 9,758,072 B2  
APPLICATION NO. : 14/906420  
DATED : September 12, 2017  
INVENTOR(S) : Vaudt et al.

Page 1 of 1

It is certified that error appears in the above-identified patent and that said Letters Patent is hereby corrected as shown below:

In the Claims

In Column 10, Line 29, in Claim 1, after "position", insert --;--

Signed and Sealed this
Twenty-eighth Day of May, 2019

Andrei Iancu
*Director of the United States Patent and Trademark Office*